Patented Aug. 29, 1933

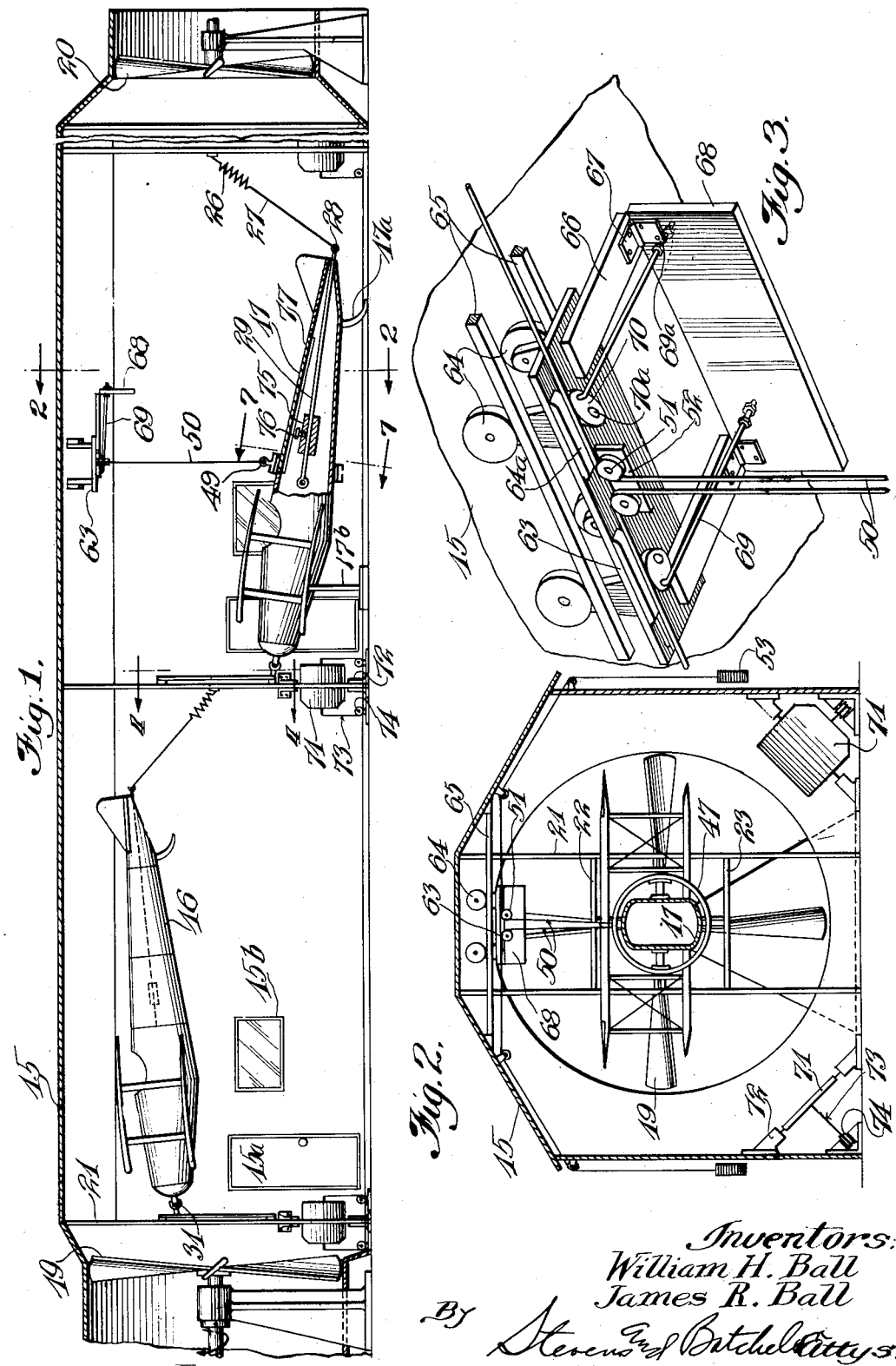

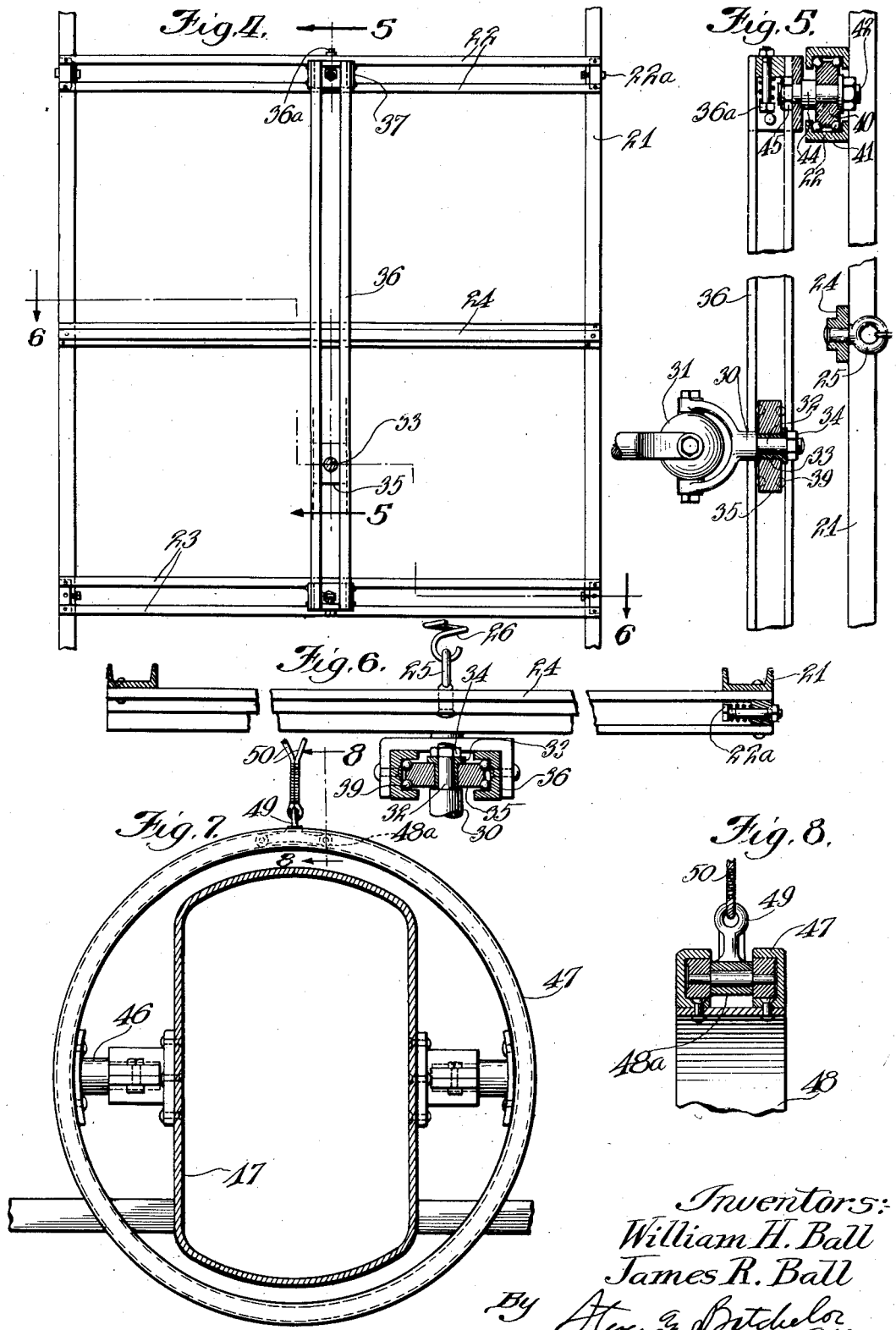

1,924,390

UNITED STATES PATENT OFFICE 1,924,390

AVIATION INSTRUCTION APPARATUS

William H. Ball, Chicago, and James R. Ball, La Grange, Ill.

Application March 15, 1929. Serial No. 347,422

11 Claims. (Cl. 35—12)

Our invention relates to apparatus for teaching aeroplane flying, and more particularly to such apparatus as is used in ground instruction, and our main object is to provide a novel apparatus along these lines which imparts the realism of actual flying while the student gains mastery of the aeroplane controls.

A further object of the invention is to so design the novel apparatus that the conditions encountered during actual flying are faced by the student during instruction and met by various maneuvers on his part conducive to the ultimate mastery of the controls to the extent of fitting the student for actual flying.

A still further object of the invention is to provide a craft simulating an aeroplane and capable of seating a student, under the supervision of an instructor, such craft being safe under all conditions incident to flying instructions.

Another object of the invention is to so dispose the aeroplane used by the student that it is capable of undergoing movements in vertical and other directions while receiving a sufficient support to render it safe.

An additional object of the invention is to build the novel apparatus for multiple instruction by the use of an elongated tunnel or housing in which a succession of individual instruction planes are disposed.

A significant object of the invention is to provide an apparatus which is suitable for amusement use, imparting with safety movements simulative of aeroplane flying.

A final but nevertheless important object of the invention is to construct the novel apparatus with few and simple parts, in order that it may be inexpensively built and easily understood and manipulated.

With the above objects in view and any others that may suggest themselves from the specification and claims to follow, a better understanding of the invention may be gained by reference to the accompanying drawings, in which—

Fig. 1 is an interior view of the tunnel or housing used for our instruction method, partly broken away;

Fig. 2 is a cross section of the housing compartment in the right-hand portion of Fig. 1, the instruction plane being raised;

Fig. 3 is a perspective view, on an enlarged scale, of a suspension means and control for the instruction plane;

Fig. 4 is an enlarged section on the line 4—4 of Figure 1;

Figs. 5 and 6 are, respectively, detail sections taken on the lines 5—5 and 6—6 of Figure 4, and broken away in places of minor importance;

Fig. 7 is an enlarged section of a suspension means shown in the center of Figure 2; and Fig. 8 is a detail section on the line 8—8 of Figure 7.

In the teaching of aviation, two classes of work are generally considered, namely, ground instruction and actual flying practice. With the development of courses by various aviation schools, it has been the practice to instruct the student on the technics of engines, aeroplanes and controls, during the process of ground schooling, but the handling of the craft and the control thereof while in the air has generally been included in the flying practice portion of the course. Accordingly, instruction aeroplanes have been in use, the instructor flying with the student to teach him the handling of the controls while the craft is actually in the air and the "feel" of the craft while subject to flying and atmospheric conditions. This practice, when entrusted to the student, has often resulted in accidents varying from those of a minor character, such as faulty landing or brushing against other objects, to accidents of a more serious character, wherein the practice plane has suffered considerable and even total damage, not to speak of injuries or loss of life to the occupants. Consequently, the high risk incident to the practice craft has demanded an extreme premium in the way of tuition for flying practice from the student, making it an expensive matter for one to continue the aviation course after completing the ground course. It has been our intention to relieve the condition described above by combining a maximum amount of flying practice with the ground course, so that incidents anticipated when flying the craft may actually be experienced with perfect safety during the ground course.

In carrying out the invention, it will be seen that we first provide a housing 15 of elongated design, and spaced to contain a number of instruction planes 16 and 17 in linear succession, each plane being a working replica of a conventional aeroplane in all respects. For facility of approach to each plane, the housing is made with a series of doors 15a and also windows 15b.

In order to simulate atmospheric conditions when an aeroplane is in flight, we cause a draught of air to blow through the tunnel, using a pressure fan 19 at one end, which may be called the front end, and an exhaust fan 20 at the opposite end. The draught of air in the first compartment being strongest, we use the same to support the plane 16, as indicated. The plane 17 is shown resting with a foot 17a upon the floor and with its wings upon a standard 17b. These adjuncts indicate that the plane is primarily supported before it is put into use, after which other supports are invoked, as will be described later, this plane and the ones following it of course receiving a lesser draught force than the plane 16.

The compartments for the succession of planes are defined by divisional frames 21, one of which is clearly shown in Figure 4. These are built of side channels 21 and spanned by top and bottom channel assemblies 22 and 23, and also by a medial bar 24. Considering the frontal side of the divisions, a connection is had from each division to the tail of the next forward plane. Thus, a swivel eye 25 is built into the cross member 24, and a spring 26 linked to the eye, as shown more particularly in Figure 5. The spring is extended with a cable 27 to connect with the looped rear end 28 of a rod 29 internally secured to the plane.

The connection between the front of the plane and the opposite division necessarily involves the rear side of the latter, and begins with a stem 30 embodying a universal joint 31. The stem is then reduced as indicated at 32 to receive a bushing 33 and is terminally threaded to receive a nut 34. The reduction 32 is loose in the bushing and the bushing is also loosely disposed in a block 35, which is vertically movable in facing channels 36 which are braced at medial and terminal points by clips 37. The assembly of the channels 36 is placed immediately along the rear side of the frame 21, and to facilitate the easy vertical travel of the block 35 in the channels 36, the corners of the block are made with ball bearings 39. Thus far it is seen that the rear end of the instruction plane is flexibly anchored to the frontal side of the corresponding divisions 21, while the front end of the model is vertically movable through the action of the block 35 in the manner of a carriage during its vertical motion in the channel assembly 36. The channel assemblies 22 and 23 are similar in their make-up to the channel assembly 36, except that their direction is horizontal for the corresponding motion of a block 40 therein, this block also having ball bearings 41. The block 40 is loosely mounted on a bolt 42 which is secured on the front side by a nut 43, has a medial enlargement 44 and becomes secured to the corresponding clip 37 by a nut 45, as clearly shown in Figure 5. It is thus seen that the assembly of the channel 36 can travel laterally along the channel assemblies 22 and 23, the front end of the aeroplane model following suit. Cushioned limits for the travel of the blocks 35 and 40 are provided in the form of spring bumpers 22a and 36a.

Relative to the floating plane 16, it is conceivable that the wind pressure created by the fan 19 will suspend it in the air to a sufficient degree to render the craft sensitive to manipulation by its controls. Thus, when manipulating the rudder the front end of the craft may swerve toward one or the other side of the housing; when manipulating the elevators, the craft may be made to dip up or down and so on, the method of suspension permitting flexibility in this respect.

In the form represented by the plane 17, we have considered it practical to rockably dispose the body of the plane by means of trunnions 46 in a ring 47, composed of laterally-spaced and inwardly facing channels, as indicated in Figure 8. The ring channels are secured on the inside by a ring 48. Within the upper portion of the ring is a wheeled carriage 48a on which the ring rides, the carriage being suspended by an eye 49 from a pair of cables 50 which lead in an upward direction to run outwardly over sheaves 51 Figure 2 and descend to carry weights 53. These weights counter-balance the craft as weighted with the student, so that the craft will then be freely suspended to rise or fall in response to the wind pressure and the effect thereof on the plane as induced by the maneuvering of the controls by the student. The support in connection with the plane 17 enables the latter to dip sidewise in either direction within the ring 48 and even to turn completely over. Thus, the student is able to appreciate the sensations of the craft as tilted to a greater or less extent or even inverted in simulation of the position when actually flying upside-down or in a figure-eight course.

The suspension of the plane 17 is more clearly shown in Figure 3. It will be seen that the first sheaves 51 over which the cables 50 run are supported in a hanger 52 which forms part of a carriage 63 which travels crosswise of the housing through the agency of upper rollers 64 upon a track 65. Thus, as the plane is urged in a lateral direction the carriage 64 will travel accordingly and the weights 62 take up and pay out the respective cables by falling or rising, with the result that the plane will maintain its balance and not be subjected to the strain of one or the other cable. It is preferable that the plane be less counterweighted at the beginning of the course to make it more stable while the student is learning the behavior of the model from the effect of the controls. As his skill increases, the counterweights are made heavier whereby to lend the plane more buoyancy and flexibility, and therefore make it more responsive to the different manipulations of the controls.

In order that the student may dismount from the plane after his lesson without occasioning the rise of the plane from the overbalancing effect of the weights 62, we have devised the following expedient. We extend the carriage 64 with rearward brackets 66 from which is hung by hinges 67 a board 68. From the latter, rods 69 are led forwardly to eccentric cams 70 pivoted at 70a under the carriage and effective when urged forwardly by the rods 69 to wedge the outgoing cables 50 against guides 64a mounted on the under side of the carriage. When the instruction apparatus is in position the wind current impinges rearwardly upon the hinged board 68, drawing the cams 70 free of the cables 50 and permitting the latter to function with the lateral travel of the plane. However, when the lesson is over and the wind current stopped, the boards automatically return to the vertical or hanging position shown, applying the cams 70 to bind the cables and thus check the plane from rising when relieved of the student's weight. The rods 69 pass loosely through the board and are threaded to receive nuts 69a on both sides of the board for adjustment relative to the latter. As the travel of the cams 70 is slight, the rods meet the board at points near the hinges thereof, also securing improved leverage there. As the wind current control affects all the planes in the housing, it may be timed to occur at the end of prescribed instruction periods or classes.

It is essential at times that the wind current in the various compartments be diverted to exert lateral pressure in simulating the lateral wind currents found in the atmosphere. For this purpose, we have provided baffle plates 71 adjacent to the side walls of the housing, journaling these for rocking adjustment in oblique shafts 72, as clearly shown in Figure 3. In this figure, the baffle plate on the left is shown parallel to the general wind current, which is a normal condition and is for this reason so indicated in Figure 2. The baffle plate at the right in Figure 3 has, however, been shown swung crosswise to the general wind current for purposes of illustration, serving to deflect the wind current against the wings, rudder, or other responsive element of the plane. As indicated in Figures 1 and 2, the baffle plates receive cable connections 73 running under sheaves 74 and extending to suitable points of individual control, so that any given baffle plate may be drawn in one direction by actuating a certain cable, and in the other direction by actuating a companion cable, the individual controls enabling conditions in any compartment of the housing to be changed or controlled as may be required.

It will be seen our novel suspension means for the planes enables the latter to respond to influences from any direction while in a condition of flexibility due to being relieved of weight. The fact that the planes are counterweighted lends them the necessary freedom to be easily affected by wind currents from the front or deflected currents from the side, so that the exercise of the proper controls brings an immediate response quite as prompt as that experienced by the craft in actual flying conditions.

It is significant that the suspension of the body portion of the planes is as near to the center of gravity as possible, which is preferably a point close to the rear of the occupant. However, in order to balance the craft with occupants of different weights, we either change the counterweights accordingly or make use of the internal rod 29 to receive a sliding weight 75, whose position is adjustable along the rod by a set screw 76, access to which can be had making the body with a lid portion 77. Thus, the craft may be balanced to maintain a level position consistent with the weight of the occupant.

In conclusion, it may be said that the novel apparatus provides a craft which not only imparts a realistic sensation to the student and the appreciation of the response in the sensitive elements of the plane, but also gives the student peace of mind through the feeling that he and the practice craft are safe from a fall or other accident. In actual flying practice, the mental tension of the student through fear that he may err in the manipulation of the controls and precipitate an unfortunate eventuality retards his progress in learning the manipulation of the controls and acquiring the "feel" of the craft. It is thus appreciated that with perfect safety assured in our novel instruction apparatus, the student can apply himself with more confidence to the mastering of the controls and concentrate all his faculties to learn the behavior of the craft under various conditions. Thus, when taking to the air later, the student will need but little coaching to acclimate himself to the flying sensation, and the risk of failure or error will be greatly reduced. It is also conceivable that the features of our apparatus may be used with sensational effect when incorporated in an amusement structure, the subject obtaining with perfect safety the thrills and peculiar experiences usually associated with a dangerous occupation.

We claim:—

1. An aviation instruction apparatus comprising a housing, means to force a wind current through the latter, a set of frames in spaced succession along the course of the current, a practice plane in each space, and means fore and aft of the planes to connect them to correspondingly located proximate frames.

2. The structure of claim 1, with baffles in the housing and adjustable to deflect the current into cross currents moving toward the plane from different directions.

3. Travel means for a practice plane comprising a stationary frame, a vertically-movable carriage, a guide structure for the latter, carriages at the end portions of the guide structure, and guides for the latter-mentioned carriages mounted on the frame for the travel of the guide structure in a lateral direction.

4. The structure of claim 3, with terminal cushion bumpers carried by said guides.

5. An aviation instruction apparatus comprising a practice plane, guide means for the front of the latter to permit the plane to move in a transverse plane, a stationary element to the rear of the latter, and a resilient connection between the plane and the stationary element.

6. An aviation instruction apparatus comprising a practice plane, guide means for the front of the latter to permit the plane to move in a transverse plane, a stationary element to the rear of the latter, and a tension spring connection between the plane and the stationary element.

7. An aviation instruction apparatus comprising a housing adapted to receive a uni-directional wind-current, a practice plane within the housing, cable means movable to suspend the plane at different heights, and clamp devices automatically locking the cable means from motion when the wind current is not in action.

8. The structure of claim 7, and a current-responsive element to release said clamping device when the wind current is in action.

9. An aviation instruction apparatus comprising a housing adapted to receive a uni-directional wind-current, a practice plane within the housing, cable means movable to suspend the plane at different heights, wedge clamps effective upon the cable means to lock the same from motion, a current-responsive vane, connecting rods between the vane and the clamps, said vane serving to draw the clamps free of the cable means when the wind current is in action.

10. An aviation instruction apparatus comprising a housing adapted to receive a uni-directional wind-current, a practice plane within the housing, cable means movable to suspend the plane at different heights, wedge clamps effective upon the cable means to lock the same from motion, a current-responsive vane, connecting rods between the vane and the clamps, said vane being hingedly suspended to assume a pendent position of rest when the wind current is not in action and in such position maintain the clamps in effective engagement with the cable means.

11. An aviation instruction apparatus comprising a practice plane, a transverse ring within which it is secured and including inwardly-facing and spaced channels, a wheeled carriage within the channels and disposing the ring for rolling support, and suspension means for the carriage.

WILLIAM H. BALL.
JAMES R. BALL.